(No Model.)

N. D. HODGKINS.
HUB PROTECTOR FOR VEHICLES.

No. 518,951. Patented May 1, 1894.

Witnesses:
M. L. Raymond.
Merwin E. Asire.

Inventor:
Nelson D. Hodgkins,
By Clark and Pearl
Attorneys

THE NATIONAL LITHOGRAPHING COMPANY,
WASHINGTON, D. C.

UNITED STATES PATENT OFFICE.

NELSON D. HODGKINS, OF MARQUETTE, MICHIGAN, ASSIGNOR OF ONE-HALF TO FREDERICK O. CLARK, OF SAME PLACE.

HUB-PROTECTOR FOR VEHICLES.

SPECIFICATION forming part of Letters Patent No. 518,951, dated May 1, 1894.

Application filed January 3, 1894. Serial No. 495,495. (No model.)

*To all whom it may concern:*

Be it known that I, NELSON D. HODGKINS, of Marquette, county of Marquette, and State of Michigan, have invented a new and novel device to prevent the sand, gravel, and other dirt thrown upon the hub of a wheel upon a heavy double wagon or cart and thence upon the axle of said wagon or cart from working into the inside of the hub and grinding out the stub of the axle when the wheel is in motion, of which the following is a specification.

My invention has for its objects, first, the production of a mechanism which will cause the stub of said axle to last very much longer in use than it will when not so protected; second, a mechanism that can be firmly attached to the axle of said wagon or cart on the inside of the hub of said vehicle by a clamp, with a projecting shield extending over the hub of said wheel on the inside of the spokes of the wheel in a durable and efficient form, so as to protect the axle when in use, as above set forth; third, a mechanism that can be constructed and applied as set forth, at a very small cost and at the same time be efficient and durable.

Figure 1:
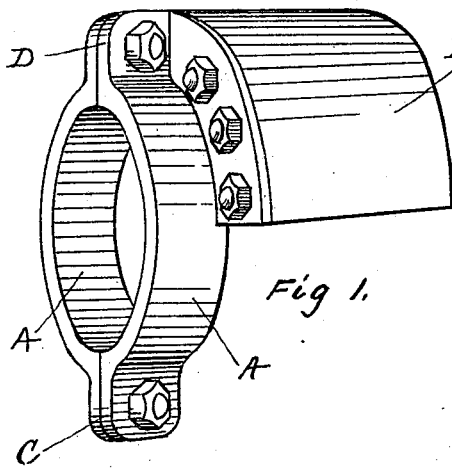
Figure 2:
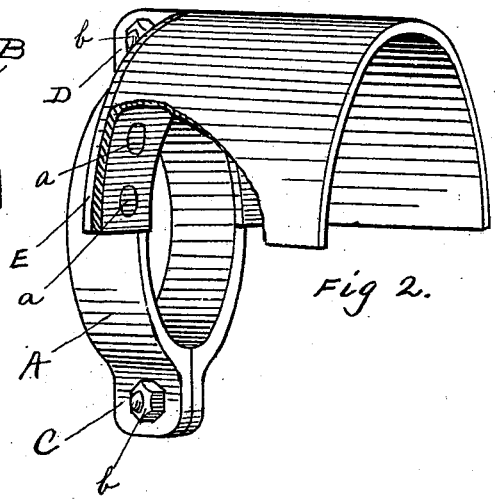
Figure 3:
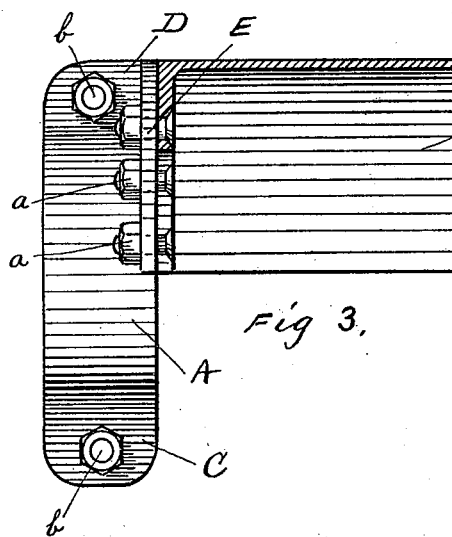
Figure 4:
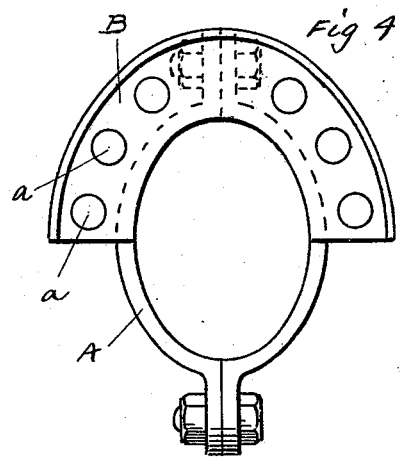
Figure 5:
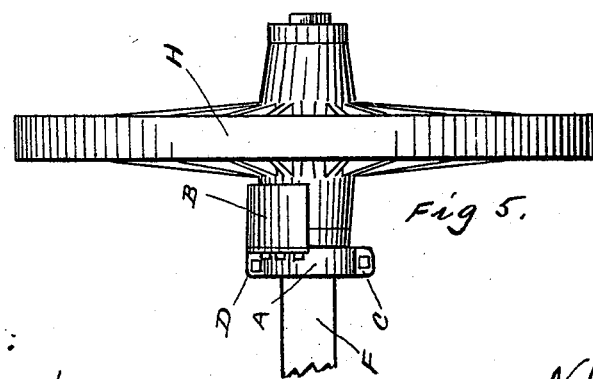

I accomplish the above results as follows:

Figure 1 is a perspective view of my invention. Fig. 2 is a perspective view of my invention, with parts broken away, to show heads of bolts a and also to show the shield B bolted upon shoulder E, as attached to the circular clamp A. Fig. 3 is a side view of circular clamp A, with half section of shield B, showing mode of fastening the two together. Fig. 4 is an end view of shield B, as fastened to shoulder E on circular clamp A, showing the mode of fastening said shield B to said shoulder E; and also showing the mode of bolting together the two parts of circular rim A by means of bolts b b passing through lugs C and D. Also showing shoulder E in two parts, held together by the lug D and also held together by circular shield B bolted thereto. Fig. 5 is a side view of my device adjusted upon the wheel of a wagon ready for use.

Circular clamp A is made of light band iron, or steel, or other metal, of such thickness as durability may require. Clamp A consists of two parts fastened together around the axle F by bolts passing through lugs C and D. Clamp A is fastened upon the axle F just inside the hub G and close thereto. Attached to said clamp A is shoulder E which is in two parts and may be riveted or welded upon the outer rim, and upon the upper side of said clamp A, as it appears when adjusted upon axle F. Said shoulder E is circular in form, and in two parts to correspond with the shape of the circular clamp A, and extends nearly half way around said circular clamp A, and rises above said circular clamp A, when welded thereon, so that when said clamp A is adjusted upon the axle F, the said shoulder will rise flush with lug D and slightly above the upper side of hub G. Attached to this shoulder E is circular shield B, consisting of thin Russia iron or other suitable material; which shield B is bolted to the outer side of said shoulder E, and is bent in circular form to correspond with said shoulder E, and extends outward so as to lap over the hub G of the wheel, nearly to the spokes, and close to the hub, as shown by the diagram; leaving space between the shield B and hub G sufficient to prevent friction, and is fastened only to shoulder E by bolts, a, a, as shown in the diagram. Circular shield B is loose upon the hub, so as to have such spring as to adjust itself to the hub of the wheel when in use, and prevent friction.

It will be noticed that said device is so constructed as to be strong and durable, and especially suitable for use upon heavy double wagons and carts, and is an improvement over and superior to any other device within my knowledge, for the purposes stated, and for use upon double wagons and heavy carts, and this device will add greatly to the durability of the stub of such axle.

What I claim is—

1. The combination of the circular clamp A provided with lugs C and D, through which bolts, b, b, pass, holding the two parts of circular rim A together, with shoulder E bolted or welded thereto, with circular shield B bolted to said shoulder E, substantially as shown and described.

2. The combination of the circular clamp A provided with lugs C and D, through which pass bolts, $b, b$, holding the two parts of circular clamp together, with shoulder E bolted or welded thereto, with circular shield B bolted to said shoulder E by bolts, $a, a$, and attached to wagon axle F, substantially as shown and described.

NELSON D. HODGKINS.

In presence of—
  M. L. RAYMOND,
  M. E. ASIRE.